United States Patent [19]

Nasser, Jr. et al.

[11] B 4,130,505

[45] Dec. 19, 1978

[54] TWO STAGE ACTIVATION OF FLUORIDED CHROMIUM-CONTAINING CATALYST

[75] Inventors: Benny E. Nasser, Jr.; Richard E. Dietz, both of Bartlesville, Okla.

[73] Assignee: Phillips Petroleum Company, Bartlesville, Okla.

[21] Appl. No.: 509,640

[22] Filed: Sep. 26, 1974

[44] Published under the second Trial Voluntary Protest Program on Feb. 17, 1976 as document No. B 509,640.

[51] Int. Cl.$^2$ .................. B01J 21/02; B01J 27/06; B01J 29/00
[52] U.S. Cl. .................. 252/432; 252/442; 252/458
[58] Field of Search ............... 252/432, 441, 442, 458

[56] References Cited

U.S. PATENT DOCUMENTS

| | | | |
|---|---|---|---|
| 3,007,905 | 11/1961 | Bailey | 252/458 |
| 3,130,188 | 4/1964 | Hogan | 260/94.9 |
| 3,165,504 | 1/1965 | Hogan | 260/94.9 |
| 3,445,367 | 5/1969 | Kallenbach | 260/94.9 |
| 3,692,697 | 9/1972 | Kravitz et al. | 252/441 |
| 3,887,494 | 6/1975 | Dietz | 252/452 |

FOREIGN PATENT DOCUMENTS

| | | | |
|---|---|---|---|
| 426,129 | 7/1972 | Australia | 260/94.9 |
| 715,154 | 8/1965 | Canada | 260/94.9 |
| 903,745 | 6/1972 | Canada | 260/94.9 |
| 912,275 | 12/1962 | United Kingdom | 260/94.9 |
| 927,966 | 6/1963 | United Kingdom | 260/94.9 |

Primary Examiner—J. Poer

[57] ABSTRACT

Catalyst is produced by first activating a chromium-containing silicon-containing support at calcination temperature, treating with a fluoride compound and thereafter heating at a lower temperature of 300° to 1000°F for about 1 to 20 hours. Catalysts thus produced are of particular utility in the production of narrow molecular weight distribution ethylene polymers.

12 Claims, 2 Drawing Figures

TWO STAGE ACTIVATION OF FLUORIDED CHROMIUM-CONTAINING CATALYST

BACKGROUND OF THE INVENTION

This invention relates to fluoride-containing chromia-silica catalysts.

Supported chromium-containing catalysts can be used to prepare olefin polymers in a hydrocarbon solution to give a product having excellent characteristics from many standpoints. Supported chromium-containing catalysts can also be used to prepare olefin polymers in a slurry system wherein the polymer is produced in the form of small particles of solid material suspended in the diluent. This process, frequently referred to as a particle-form process, has the advantage of being less complex. However, there is substantially less leeway in controlling the ultimate properties of the polymer produced when using the particle-form process. For instance, one method of controlling molecular weight of the resulting polymer in the solution process is simply to vary the temperature, with lower molecular weight (high melt flow) polymer being produced at the higher temperature. It is readily apparent that this type of process control is severely limited in the particle-form process since any substantial increase in temperature would cause the polymer to go into solution. This problem is further complicated in the particle-form process when it is desired to produce a relatively narrow molecular weight distribution polymer having a relatively high melt flow.

BRIEF SUMMARY OF THE INVENTION

It is an object of this invention to provide a catalyst for producing narrow molecular weight distribution polymer in a particle-form process;

and it is yet a further object of this invention to provide a catalyst for producing high melt flow narrow molecular weight distribution polymer;

it is yet a further object of this invention to provide a simplified process for producing olefin polymers;

it is yet a further object of this invention to provide an improved chromium-containing catalyst; and it is still yet a further object of this invention to provide an improved process for producing an active catalyst.

In accordance with this invention, a silicon-containing support containing chromium is activated at calcination temperature, cooled, thereafter fluorided and then reheated at a lower temperature of 300° to 1000°F.

BRIEF DESCRIPTION OF THE DRAWINGS

In the drawings which form a part hereof.

DESCRIPTION OF THE PREFERRED EMBODIMENTS

Figure 1:
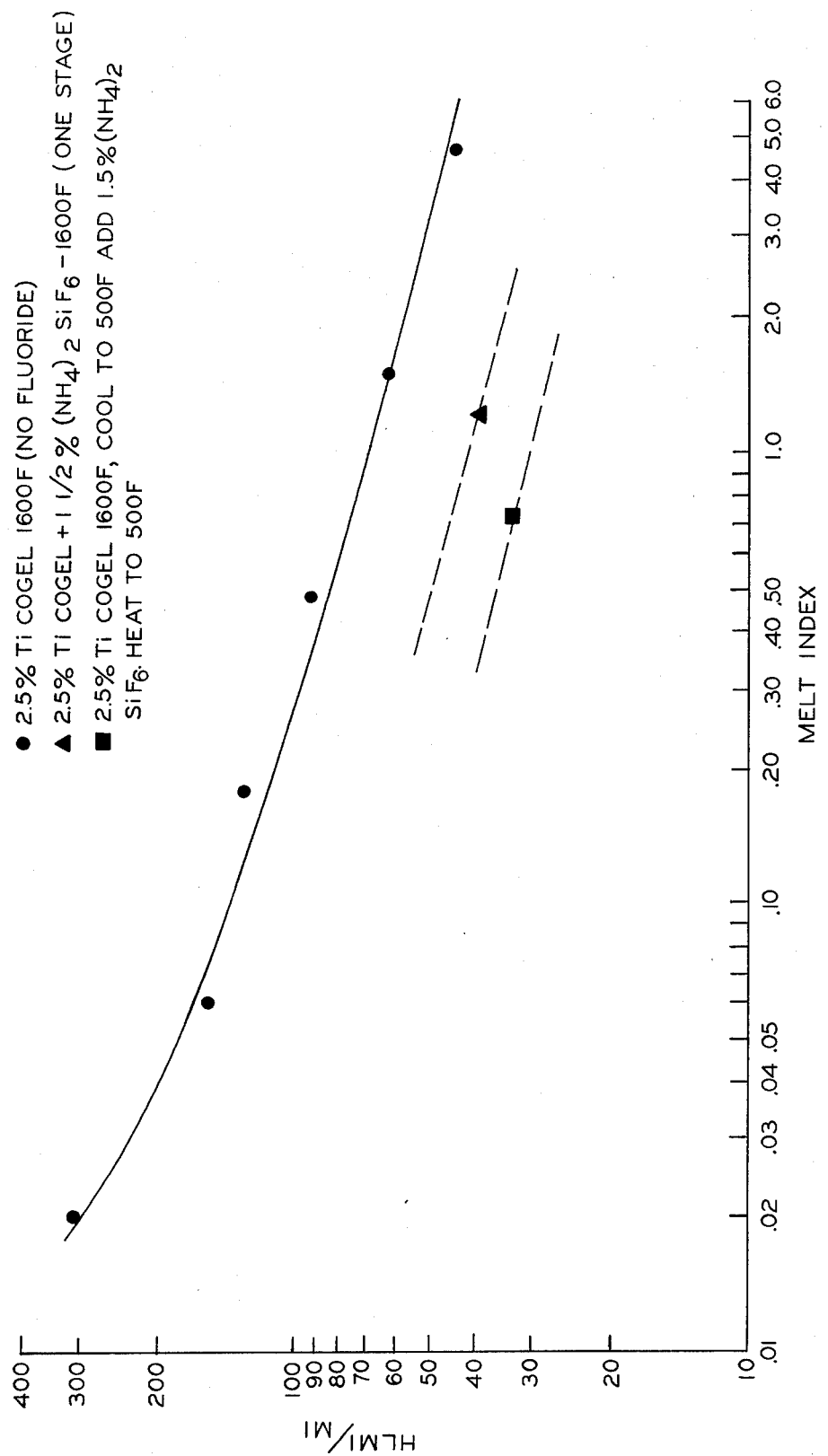
FIG. 1 is a plot of melt index versus HLMI/MI ratio comparing catalyst activated at a single temperature with catalyst activated using the two stage activation of this invention for polymerizing ethylene in a particle-form process and FIG. 2 is a similar plot of catalyst within the scope of the invention and catalyst produced using a single activation temperature in the production of ethylene polymers in a solution system.

Any of the silicon-containing supports known in the art are suitable for use in accordance with this invention. Such supports include silica, silica alumina, silica-titania and the like. These supports are particulate in nature and can be prepared by precipitation and coprecipitation techniques, or by mixing silica with other refractory materials. For example, sodium silicate can be added to an acid such as sulfuric acid, the resulting precipitate aged for 1 hour, water-soluble salts removed by washing with water, and then the water removed by azeotropic distillation with a material such as ethyl acetate. Silica generally constitutes a major portion of the support with other metal compounds when used making up from 0.1 to about 20 weight percent of the finished catalyst. The support preferably contains titanium either as an integral part thereof as in the form of titanium added aqueously to the hydrogel or nonaqueously to the dried support prior to the calcination. Such supports already containing titanium can be produced by cogelling silica and titanium and such constitute the most preferred supports. This can be carried out by coprecipitating an alkali metal silicate solution such as water glass and a titanium compound such as titanyl sulfate by adding said silicate to a mineral acid such as sulfuric acid, said acid containing said titanium compound, to form a hydrogel. The hydrogel is preferably aged for a time of greater than 1 hour, washed with water to produce a substantially alkali metal-free hydrogel and then treated with a water-soluble oxygen-containing liquid organic compound to effect azeotropic distillation to remove water and then form a xerogel.

The chromium is incorporated with the support prior to activation at calcination temperature. It can be incorporated in any manner known in the art. For instance, an aqueous solution of chromium trioxide or a material convertible to chromium oxide such as chromium nitrate, chromium acetate and the like can be used to impregnate the support with chromium. Alternatively the support can be treated with a hydrocarbon containing an organic chromium compound. For instance, a hydrocarbon solution of tertiary butyl chromate can be used. Alternatively, solid chromium compound can simply be mixed with the support. A sufficient amount of chromium is added so as to provide from 0.1 to 10, preferably 0.5 to 4 weight percent chromium in the final catalyst based on the weight of the total final catalyst. The resulting chromium-silica support is then heated to calcination temperature as is known in the art, this generally being carried out at a temperature within the range of 800° to 2000°F, preferably 900° to 1700°F for a time within the range of ½ to 50, preferably 1 to 10 hours in an oxygen containing atmosphere such as dry air. Preferably this is carried out through the use of a stream of fluidizing air, which fluidizing air stream is continued as the material is cooled.

The calcined chromium-silica support thus cooled, preferably to about room temperature, is then mixed with an anhydrous fluorine containing compound. This fluoriding operation is preferably carried out simply by continuing the fluidizing air input and adding a powdered material such as ammonium silicofluoride, ammonium fluoroborate or the like. Alternatively, a nonaqueous solution of a hydrocarbon soluble fluorine-containing compound can be utilized to introduce the fluoride, the essential feature at this point being the incorporation of the fluoride under nonaqueous conditions. Suitable fluorine-containing compounds are described in U.S. Pat. No. 3,130,188 (Hogan), U.S. Pat. No.

3,165,504 (Hogan), and U.S. Pat. No. 3,445,367 (Kallenbach), the disclosures of which are hereby incorporated by reference. The amount of fluorine-containing compound added is generally within the range of about 0.1 to 10, preferably 1 to 3 weight percent based on the final weight of the composite, more preferably about 1 to 2.5 weight percent. The support having the fluorine-containing compound thus incorporated therewith is then heated to a temperature within the range of 300° to 1000°F, more preferably 450° to 750°F for a time within the range of 1 to 20 hours, the temperature of this second heating being lower than the temperature of the first heating generally by at least 200°F.

The resulting polymers are normally solid and consist of polyethylene and copolymers of ethylene with another mono-1-olefin containing from 3 to 8 carbon atoms per molecule. Examples of the 1-olefin comonomer include propylene, 1-butene, 1-hexene, 1-octene and the like.

The catalysts of the invention are particularly useful for the preparation of high melt flow narrow molecular weight distribution ethylene polymers. When the particle-form process is used, the term "high melt flow" refers to polymers having at least 0.1 regular melt index and it can range up to 5 or higher. When the solution process is used, there is no problem in obtaining polymers having a melt index ranging from 0.1 or lower to 50 or more. However, the method of the invention can be utilized in this process in narrowing the molecular weight distribution of the polymers compared to polymers of the same melt index made in the absence of this invention. The invention is of particular advantage in the preparation of particle-form polymers having shear responses approaching those of solution process polymers of a similar melt index. The melt index is determined by ASTM D 1238-62T, Condition E. The polymers which are produced with the catalyst made in accordance with this invention are normally solid homopolymers of ethylene or copolymers of ethylene with another mono-1-olefin containing 3 to 8 carbon atoms per molecule. As an example, the olefin polymer can be produced from at least one aliphatic mono-1-olefin having 2 to 8 carbon atoms per molecule. Exemplary copolymers include those of ethylene/propylene, ethylene/1-butene, ethylene/1-hexene, and ethylene/1-octene and the like. The major portion of such copolymers is derived from ethylene and generally consists of about 80 to 99, preferably 95 to 99 mole percent of ethylene. These polymers are well suited for extrusion, blow molding, injection molding and the like.

The polymerization process using the catalyst of this invention is conducted in the gaseous phase or in liquid phase, generally in the presence of an inert hydrocarbon diluent. Suitable diluents are those hydrocarbons having from 3 to 12 carbon atoms per molecule, generally selected from paraffins, cycloparaffins, and aromatics with the paraffinic hydrocarbons being more preferred. Preferred diluents include propane, n-butane, isobutane, n-pentane, isopentane, n-hexane, n-heptane, 2,2,4-trimethylpentane, cyclopentane, cyclohexane, methylcyclohexane, n-dodecane, and mixtures thereof. It is preferred to have one of the previously mentioned diluents present in the liquid phase to facilitate removal of the heat of reaction. The pressure is generally in the range of 0 to 2000 psig and need be no more than sufficient to maintain the reaction mixture in liquid phase, i.e., 50 to 750 psig.

The reaction in accordance with this invention is generally carried out within the temperature range of 100° to 500°F. Most frequently, the range is from 150° to 350°F since polymer yields are highest within this range. In a presently preferred embodiment, the temperature range is from 150° to 230°F so that the polymer particles form a suspension in the reaction mixture, i.e. particle form process. At higher temperatures the polymer in most cases forms in solution in the diluent in the reaction zone, i.e. a solution process.

The contacting of monomer or monomers with the catalyst can be effected by any of the techniques known in the art of solid catalysis. A convenient method is to suspend the catalyst in the liquid diluent and to agitate the reaction mixture, thus maintaining the catalyst as a solid suspension in the liquid diluent. Other known catalytic contacting methods such as fixed bed, fluidized bed, gravitating bed, etc., can also be used. Reference to production of ethylene polymers according to particle form processes is found in U.S. Pat. No. 3,624,063, the disclosure of which is hereby incorporated by reference.

The particle-form process in which the catalyst of this present invention is particularly applicable is a process in which at least one olefin is polymerized at a temperature within the range of about 150°–230°F by means of the catalyst of the invention. The catalyst is maintained in suspension and is contacted with the olefin or mixture of olefins in an organic medium at pressures sufficient to maintain the medium and at least a portion of the olefins in the liquid phase. The medium and temperature are such that the polymer produced is insoluble in the medium and is recovered in the form of solid particles. The organic medium (diluent) is generally a paraffin and/or cycloparaffin having from 3 to 12 carbon atoms per molecule. Representative examples include propane, butane, isobutane, pentane, isopentane, cyclohexane, n-dodecane, methylcyclohexane and the like. Pressures can range from about 100 to 700 psig or higher, and catalyst concentrations can range from 0.001 to about 1 weight percent based on the weight of the reactor contents.

Hydrogen can be used to modify the molecular weight of the polymers produced with the catalyst of this invention if desired, the catalyst of this invention being particularly sensitive to the beneficial effects of introducing hydrogen to control molecular weight. Partial pressure of hydrogen when hydrogen is used can be within the range of 5 to 100 psig, preferably 10 to 50 psig. The melt indices of the polymers produced in accordance with the instant invention can range from about 0.1 to about 70 or even higher.

EXAMPLE 1

Ethylene was polymerized in the solution process to homopolymers in a 2 liter stirred reactor containing 3/4 lb. cyclohexane as the solvent. Reactor conditions consisted of: 275°F temperature, 450 psig and a 1 hour reaction time unless otherwise indicated. The catalyst supports consisted of silica-titania gels prepared by coprecipitation techniques. Each hydrogel was aged, washed and impregnated with an aqueous solution of a chromium compound sufficient to give a nominal chromium content of 1 percent based on the weight of the final composition. Each gel was dried by azeotrope distillation with ethyl acetate. Each sample was admixed with the amount of dry ammonium silicofluoride (AS) shown in Table 1 but the temperature and manner of activation differed as follows. In the control run, the AS was mixed with each catalyst and the composites were activated by heating in fluidized dry air at 1600°F for 4 hours. In the invention runs, each catalyst was heated in fluidized dry air at 1600°F for 4 hours and cooled to room temperature while fluidization continued. The AS was then added to the fluidized sample and the composite was reheated to 500°F for 1 hour, unless otherwise indicated, to activate it. In the Table, activation temperature means the temperature to which the catalyst just promoted by AS was heated and activation time means the time which each mixture was heated. MI refers to melt index as determined by ASTM D1238-62T condition E, HLMI refers to high load melt index as determined by ASTM D1238-62T, condition F. The HLMI/MI ratio is a measure of the molecular weight distribution of the polymer, the smaller the number the narrower the molecular weight distribution. The amount of catalyst used in each run is shown in the last column. The results are presented in Table 1.

seen that productivity was improved, HLMI/MI ratio increased slightly and melt index was decreased. With increased AS content on the catalyst as in Run 4 and comparing it with Run 2 it can be seen that productivity is substantially decreased, the melt index of the polymer is decreased and the HLMI/MI ratio is decreased, the latter showing that increasing AS content results in more narrowing of the molecular weight distribution of the prepared polymer. Runs 5 through 11 are grouped in pairs illustrating the narrowing of molecular weight distribution over catalysts of similar titanium content and similar AS content, one catalyst of each pair made according to the prior art (Runs 6, 7, 9, 11) and one catalyst of each pair prepared according to this invention (Runs 5, 3, 8, 10). In every instance, it can be seen that more narrowing of the molecular weight distribution of the polymers occurs over catalysts treated according to this invention than in the control runs. Also illustrated is the effect of the titanium content of the catalysts on the melt index and HLMI/MI ratio of the polymers prepared over them. At similar reactor condi- Table 1

Solution Process Polymerization

| Run No. | AS Activation Temp., °F | AS Activation Time, Hours | Wt. % | Ti Content Wt.% | MI | HLMI MI | Catalyst Productivity | Wt. Gms |
| --- | --- | --- | --- | --- | --- | --- | --- | --- |
| 1 | 1600 | 4 | 1.5 | 2.5 | 34.6 | 23.0 | 2450 | 0.03 |
| 2(inv) | 500 | 1 | 1.5 | 2.5 | 28.5 | 20.2 | 1260 | 0.11 |
| 3(inv) | 500 | 16 | 1.5 | 2.5 | 14.3 | 20.7 | 1930 | 0.06 |
| 4(inv) | 500 | 1 | 2.5 | 2.5 | 21.0 | 19.2 | 530 | 0.09 |
| 5(inv) | 500 | 16 | 1.5 | 1.5 | 17.9 | 21.5 | 2290 | 0.05 |
| 6 | 1600 | 4 | 1.5 | 1.5 | 23.3 | 23.4 | 1920 | 0.05 |
| 3(inv) | 500 | 16 | 1.5 | 2.5 | 14.3 | 20.7 | 1930 | 0.06 |
| 7 | 1600 | 4 | 1.5 | 2.5 | 21.4 | 26.4 | 2640 | 0.03 |
| 8(inv) | 500 | 16 | 1.5 | 3.5 | 10.2 | 23.0 | 2540 | 0.05 |
| 9 | 1600 | 4 | 1.5 | 3.5 | 6.6 | 35.6 | 3300 | 0.04 |
| 10(inv) | 500 | 16 | 1.5 | 7.5 | 4.5 | 27.9 | 910 | 0.04 |
| 11 | 1600 | 4 | 1.5 | 7.5 | 4.4 | 40.2 | 1245 | 0.04 |

Reaction time for Run 11 was 50 minutes.

Productivity is expressed as pounds polymer per pound of catalyst.

The polymers obtained in the first four runs illustrate the effects of practicing the activation procedure of this invention on catalysts of similar Ti content and of increasing the amount of AS placed on the catalyst. Run 1 is an example of prior art practices. Comparing Run 2 (invention run) with Run 1 it can be seen that the HLMI/MI ratio is lower, thus more narrowing of the molecular weight distribution of the polymer results from following the novel activation procedure of this invention than in following prior art practices. However, decreases in melt index and productivity also occurred. When the activation period was increased from 1 hour as in Run 2 to 16 hours in Run 3 it can be tions and similar AS contents of the catalysts, as the Ti content of the catalyst increased, the melt index of the polymers decreased and the HLMI/MI ratio of the polymers increased, the latter effect most pronounced for catalyst prepared according to the prior art.

EXAMPLE 2

Another series of catalysts was prepared in a manner similar to those of Example 1. The catalysts, each containing 1.5 weight percent AS, were used to polymerize ethylene in the particle form process in a 3 liter stirred reactor containing 1¼ pounds of isobutane as the diluent. Reactor conditions consisted of: 230°F temperature and 550 psig. The column headings in Table 2 have the same meanings as in Table 1. The following results were obtained.

Table 2

Particle Form Polymerization

| Run No. | AS Activation Temp., °F | AS Activation Time Hours | Ti Content wt. % | MI | HLMI MI | Reaction Time, Hours | Catalyst Productivity | Wt. Gms |
| --- | --- | --- | --- | --- | --- | --- | --- | --- |
| 12(inv) | 700 | 1 | 2.5 | 0.99 | 33.5 | 1½ | 5020 | 0.04 |
| 13(inv) | 500 | 16 | 3.5 | 0.65 | 34.8 | 1½ | 5000 | 0.06 |
| 14 | 1600 | 4 | 3.5 | 0.52 | 54.0 | 1½ | 5000 | 0.05 |
| 15(inv) | 500 | 16 | 2.5 | 0.72 | 33.0 | 1½ | 4650 | 0.05 |
| 16 | 1600 | 4 | 2.5 | 1.20 | 39.2 | 1 | 5180 | 0.06 |
| 17(inv) | 500 | 16 | 1.5 | 0.72 | 32.6 | 2 | 5440 | 0.05 |

Table 2—continued

| | Particle Form Polymerization | | | | | | |
|---|---|---|---|---|---|---|---|
| | AS | | | | | | |
| Run No. | Activation Temp., °F | Time Hours | Ti Content wt. % | MI | HLMI MI | Reaction Time, Hours | Catalyst Productivity | Wt. Gms |
| 18 | 1600 | 4 | 1.5 | 1.48 | 35.0 | 1 1/6 | 5040 | 0.04 |

Inspection of the results shows that polymers made over invention catalysts in Runs 12, 13, 15, 17 compared to polymers of corresponding control Runs 14, 16, 18 have a smaller HLMI/MI ratio indicating the enhanced narrowing of the molecular weight distribution of the polymers made from the invention catalysts. Although ethylene copolymers were not made the same effect is expected in preparing them as is found in preparing the homopolymers.

Figure 2:
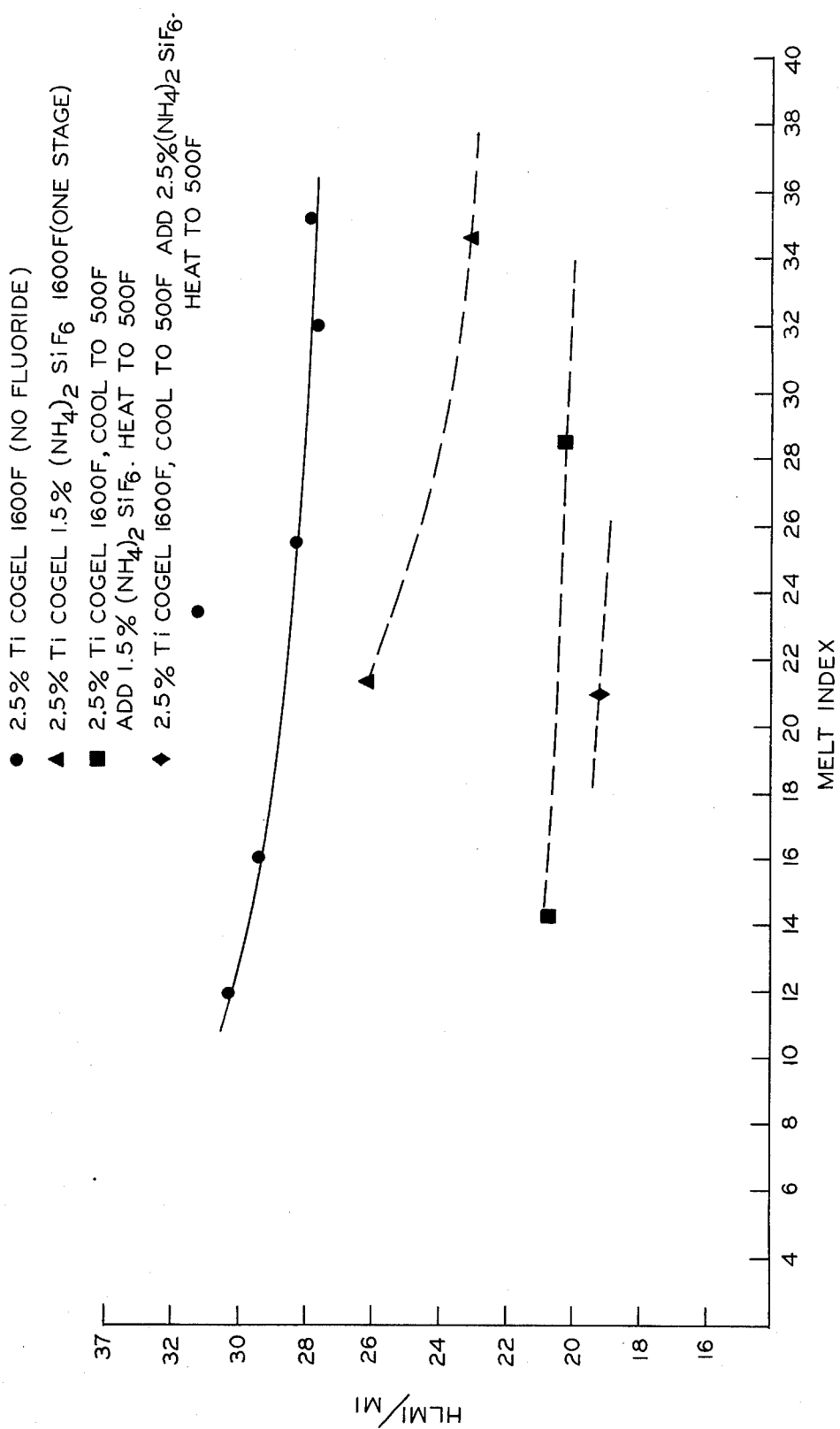

The effect of practicing this invention is graphically shown in FIG. 1, polymers made in the solution process, and in FIG. 2, polymers made in the particle form process. In the Figures, control samples containing no AS are compared to those containing AS, one set prepared according to this invention and one set prepared according to the prior art (one stage heating of support containing chromium and fluorine compounds at 1600°F). Although one point data is used in constructing several of the curves it is believed a family of curves having similar slopes is valid as shown over the melt index range illustrated. In every instance, catalysts prepared according to this invention (introducing fluorine-containing compound into calcined support and reheating at lower temperature) produced polymers having narrower molecular weight distributions than polymers made with the control catalysts.

While this invention has been described in detail for the purpose of illustration, it is not to be construed as limited thereby but is intended to cover all changes and modifications within the spirit and scope thereof.

What is claimed is:

1. A process for producing a catalyst comprising:
   calcining a chromium-containing silicon-containing support;
   cooling said thus calcined support and incorporating therewith an anhydrous fluorine-containing compound; and
   thereafter heating said support containing said fluorine-containing compound at a temperature within the range of 300° to 1000°F, which temperature is lower than the temperature used for said calcining.

2. A method according to claim 1 wherein said silicon-containing support is one of silica, silica-alumina, or silica-titania.

3. A method according to claim 1 wherein said calcining is done at a temperature within the range of 900° to 1700°F.

4. A method according to claim 1 wherein said calcining is done under an atmosphere of flowing dry air.

5. A method according to claim 1 wherein said heating of said fluorine-containing support is done at a temperature within the range of 450° to 750°F for a time within the range of 1 to 20 hours.

6. A method according to claim 5 wherein said silicon-containing support is one of silica, silica-alumina, or silica-titania, and wherein said calcining is carried out at a temperature within the range of 900° to 1700°F for a time within the range of ½ to 50 hours under an atmosphere of flowing dry air.

7. A method according to claim 6 wherein said chromium containing support is formed by treating silica, silica-alumina, or silica-titania with an aqueous solution of a chromium compound.

8. A method according to claim 6 wherein said fluorine containing compound is one of ammonium silicofluoride or ammonium fluoroborate and is incorporated by introducing said compound in the form of a powder to said calcined support while maintaining an atmosphere of fluidizing dry air.

9. A method according to claim 6 wherein said silicon-containing support consists essentially of a composition formed by coprecipitating an alkali metal silicate and a titanium compound, said catalyst containing 0.1 to 10 weight percent chromium based on the weight of the catalyst, the anhydrous fluorine containing compound being added in an amount within the range of 0.1 to 10 weight percent based on the weight of the catalyst and said support contains 0.1 to 20 weight percent of a titanium compound based on the weight of said catalyst.

10. A method according to claim 9 wherein said chromium is introduced into said silicon-containing support by treating said support with a solution of a chromium compound convertible to chromium oxide on calcination in an amount sufficient to give 0.5 to 4 weight percent chromium based on the weight of the catalyst and said fluorine-containing compound is incorporated by introducing powdered ammonium silicofluoride while fluidizing air from said calcining is still flowing through the cooled calcined base said ammonium silicofluoride being added in an amount within the range of 1 to 2.5 weight percent based on the weight of the catalyst and wherein said heating is at a temperature of at least 200° F. lower than said temperature used for said calcining.

11. A catalyst according to claim 1.

12. A catalyst according to claim 10.

* * * * *